United States Patent
Mano

(10) Patent No.: US 11,873,242 B2
(45) Date of Patent: Jan. 16, 2024

(54) METHOD FOR BIOLOGICALLY TREATING AMMONIUM PERCHLORATE WITH POOLING OF THE MICROFILTRATION

(71) Applicant: ArianeGroup SAS, Paris (FR)

(72) Inventor: Aurélie Mano, Andernos-les-Bains (FR)

(73) Assignee: ARIANEGROUP SAS, Paris (FR)

( * ) Notice: Subject to any disclaimer, the term of this patent is extended or adjusted under 35 U.S.C. 154(b) by 177 days.

(21) Appl. No.: 17/455,259

(22) Filed: Nov. 17, 2021

(65) Prior Publication Data
US 2022/0153619 A1    May 19, 2022

(30) Foreign Application Priority Data
Nov. 18, 2020    (FR) ........................ 2011719

(51) Int. Cl.

| | |
|---|---|
| C02F 3/30 | (2023.01) |
| C02F 1/44 | (2023.01) |
| C02F 3/34 | (2023.01) |
| C02F 3/10 | (2023.01) |
| C02F 3/12 | (2023.01) |
| C02F 101/12 | (2006.01) |
| C02F 101/16 | (2006.01) |
| C02F 103/34 | (2006.01) |

(52) U.S. Cl.
CPC .............. *C02F 3/302* (2013.01); *C02F 1/444* (2013.01); *C02F 3/106* (2013.01); *C02F 3/121* (2013.01); *C02F 3/341* (2013.01); *C02F 2101/12* (2013.01); *C02F 2101/163* (2013.01); *C02F 2103/34* (2013.01); *C02F 2209/08* (2013.01)

(58) Field of Classification Search
CPC ................ C02F 1/444; C02F 2101/003; C02F 2101/12; C02F 2101/16; C02F 2101/163; C02F 2103/34; C02F 2209/08; C02F 2301/08; C02F 3/106; C02F 3/121; C02F 3/1268; C02F 3/2813; C02F 3/2853; C02F 3/302; C02F 3/341; C02F 9/00
USPC .............................................. 210/195.1, 630
See application file for complete search history.

(56) References Cited

U.S. PATENT DOCUMENTS

2018/0222782 A1*    8/2018    Thomson ................ C02F 3/341

FOREIGN PATENT DOCUMENTS

EP    3028997 A1    6/2016

OTHER PUBLICATIONS

Search Report issued in French Patent Application No. 2011719 dated Jun. 16, 2021.

* cited by examiner

*Primary Examiner* — Claire A Norris
(74) *Attorney, Agent, or Firm* — Pearne & Gordon LLP

(57) ABSTRACT

TA method for treating an aqueous solution containing ammonium perchlorate and optionally nitrate ions, the method having a nitrification/denitrification sequence then a step of reducing perchlorates, the liquid effluent obtained at the end of this step of reducing perchlorates being subjected to a first membrane filtration, the liquid effluent obtained following this first membrane filtration being put into contact, in a reactor in aerobic conditions, with microorganisms able to carry out the oxidation of organic materials, then the liquid effluent leaving this reactor being subjected to a second membrane filtration, the first membrane filtration and the second membrane filtration being carried out on the same membrane filtration unit.

7 Claims, 1 Drawing Sheet

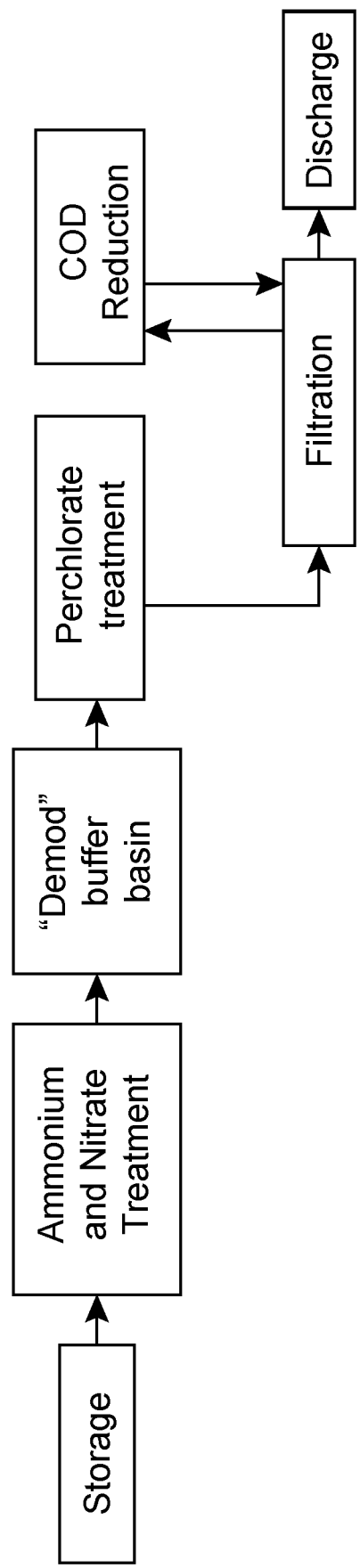

METHOD FOR BIOLOGICALLY TREATING AMMONIUM PERCHLORATE WITH POOLING OF THE MICROFILTRATION

CROSS-REFERENCE TO RELATED APPLICATIONS

This application claims priority to French Patent Application No. 2011719 filed on Nov. 18, 2020, the entire content of which is incorporated by reference herein.

TECHNICAL FIELD

The present invention relates to the field of biologically treating an aqueous solution containing ammonium perchlorate and more particularly an aqueous solution containing ammonium perchlorate resulting from the treatment of propellants.

Indeed, the present invention aims to provide a method that is simple, easy to implement, environmentally-friendly and that makes it possible to obtain, after treatment, a discharge effluent that has satisfactory capacities and performance in reducing (decreasing) perchlorate and compliant reduction performance in terms of chemical oxygen demand (COD) and suspended matters (SM).

PRIOR ART

Solid composite propellants are energy compositions constituted of a combustible polymer macromolecular matrix, called binder, loaded with an oxidiser and a fuel. In general, this oxidiser and this fuel respectively have the form of a solid powder and the form of metal powder.

Solid composite propellants are widely used in aerospace in the strap-on booster at take-off of space launchers or in the retrorockets of space probes. They are also used in devices such as "airbag" for automobile safety.

The dismantling of propellants or of solid composite propellant retrorockets as equipment return is a problem that has been studied for several years now. Indeed, the return of propellants and retrorockets results in the problem of the destruction thereof. The same applies, likewise, for the production waste of solid composite propellants.

A first method of destruction used for propellants and retrorockets is banned in order to be fired, thus allowing for the destruction thereof. The latter generates atmospheric pollution, especially during firings of the $1^{st}$ and $2^{nd}$ stages of the propellants, in light of the substantial quantity of solid composite propellants to be burned.

A second commonly used method to eliminate the propellants and retrorockets with solid composite propellant as well as the production waste of solid composite propellants consists of burning them in the open air. Combustion in the open air is limited by the weather conditions and generates combustion products which are a source of atmospheric pollution.

Other more environmentally-friendly methods have been developed and some involve a grinding under water of the waste comprising solid composite propellants.

Thus patent application FR 2 931 814 proposes a biological method for purifying, before the discharge thereof, aqueous solutions containing ammonium perchlorate and optionally nitrates, obtained following this grinding. This method comprises a nitrification/denitrification sequence then a step of reducing perchlorates followed by a microfiltration. It is however not specified, in patent application FR 2 931 814, the technologies implemented, following this microfiltration and before the discharge of the treated effluent, for the reduction in COD and the reduction in SM.

In practice, on one of the sites where the invention object of patent application FR 2 931 814 is used, the reduction in COD is carried out by biodiscs and the reduction in SM by a lamellar clarifier. Another technology that is conventionally used to reduce COD can implement an activated sludge basin (or tank or cell), under stirring and aeration.

Regarding the reduction in COD with activated sludge basin, under stirring and aeration, the latter is not satisfactory because the bacteria present in the aerated basin are not sufficiently retained. Indeed, the continuous process results in a loss of bacteria.

The reduction in SM requires having a device dimensioned according to the characteristics of the bacteria that it contains for the purpose of retaining the latter in the device. Moreover, the lamellar clarifiers used for the reduction in SM require maintenance with regular withdrawals to be carried out, manually, according to the observations of soiling of the clarifier. Such clarifiers are therefore difficult to implement on sites that do not have full-time monitoring.

The inventors have therefore set the goal of proposing a method that is robust, autonomous, easy to implement and that makes it possible to treat, biologically, an aqueous solution containing ammonium perchlorate and optionally nitrate ions with the purpose of obtaining a discharge effluent that is compliant in terms of reducing COD and reducing SM while still maintaining capacities and performance in reducing perchlorate and any nitrate ions, comparable to those of the methods of the prior art.

DISCLOSURE OF THE INVENTION

To do this, the present invention proposes a method for treating an aqueous solution containing ammonium perchlorate and optionally nitrate ions, said method having a nitrification/denitrification sequence then a step of reducing perchlorates, the liquid effluent obtained at the end of this step of reducing perchlorates being subjected to a first membrane filtration, the permeate obtained following this first membrane filtration being put into contact, in a reactor in aerobic conditions, with microorganisms able to carry out the oxidation of organic materials, then the liquid effluent leaving this reactor being subjected to a second membrane filtration, the first step of membrane filtration and the second step of membrane filtration being carried out on the same filtration unit.

The method according to the invention has at least one of the following optional characteristics, taken individually or in combination.

The membrane filtration unit implemented during the first step of membrane filtration and the second step of membrane filtration comprises a microfiltration membrane and a permeate tank.

The microfiltration membrane that the membrane filtration unit comprises implemented during the first step of membrane filtration and the second step of membrane filtration is a microfiltration membrane.

The microfiltration membrane that the membrane filtration unit comprises implemented during the first step of membrane filtration and the second step of membrane filtration is an ultrafiltration membrane.

The nitrification/denitrification sequence of the method according to the present invention comprises at least one step of nitrification in aerobic conditions, with nitrifying bacteria in the presence of a mineral carbonaceous substrate and of nutritional elements followed by at least one step of denitrification, in anaerobic conditions, with denitrifying bacteria in the presence of an organic carbonaceous substrate and of nutritional elements.

The step of reducing perchlorates of the method according to the present invention implements bacteria selected from the group consisting of bacteria belonging to the species *Exiguobacterium mexicanum*, bacteria belonging to the species *Bacillus cereus*, bacteria belonging to the species *Staphylococcus warneri*, bacteria belonging to the species *Staphylococcus pasteuri* and one of the mixtures thereof.

The permeate obtained at the end of the second step of membrane filtration is discharged into the natural environment.

BRIEF DESCRIPTION OF THE DRAWING

The single drawing view is a block diagram of the method for treating an aqueous solution containing ammonium perchlorate and optionally nitrate ions according to the present invention.

DETAILED DISCLOSURE OF PARTICULAR EMBODIMENTS

The present invention proposes a method for treating an aqueous solution containing ammonium perchlorate and optionally nitrate ions that makes it possible to obtain a purified effluent in terms of ammonium, nitrates, nitrites, perchlorate, organic matters and suspended matters and therefore an effluent able to be discharged into a natural environment. The treatment method according to the invention is therefore a method for purifying an aqueous solution containing ammonium perchlorate and optionally nitrate ions.

At the end of the treatment according to the present invention, the mass of ammonium perchlorate in this purified effluent represents less than 5%, less than 3%, less than 2%, less than 1%, less than 0.5%, less than 0.1% of the mass of ammonium perchlorate initially contained in the aqueous solution to be treated. Typically, the concentration in ammonium perchlorate in the purified effluent obtained at the end of the treatment according to the invention is less than 0.4 g/l of purified effluent, notably less than 0.3 g/l of purified effluent, in particular less than 0.2 g/l of purified effluent, more particularly, less than 0.1 g/l and, very particularly, about 0.01 g/l of purified effluent (i.e. 0.1 g/l±0.005 g/l). Note that, in the aqueous solution to be treated, the ammonium perchlorate is present in dissolved form i.e. in the form of perchlorate ions ($ClO_4^-$) and ammonium ions ($NH_4^+$). Typically, the concentration in $NH_4^+$ ions in the purified effluent obtained at the end of the treatment according to the invention is less than 50 mg/l of purified effluent, notably less than 40 mg/l of purified effluent, in particular less than 30 mg/l of purified effluent and, more particularly, about 20 mg/l of purified effluent (i.e. 20 mg/l±5 mg/l).

In addition, the mass of nitrate ions in this effluent represents less than 5%, less than 3%, less than 2%, less than 1%, less than 0.5%, less than 0.1% of the mass of nitrate ions initially contained in the aqueous solution to be treated. Moreover, the concentration in total nitrogen in the purified effluent obtained at the end of the treatment according to the invention is less than 80 mg/l of purified effluent, notably less than 60 mg/l of purified effluent, in particular less than 40 mg/l of purified effluent and, more particularly, about 30 mg/l of purified effluent (i.e. 30 mg/l±5 mg/l).

The concentration in SM in the purified effluent obtained at the end of the treatment according to the invention is less than 200 mg/l of purified effluent, notably less than 180 mg/l of purified effluent, in particular less than 150 mg/l of purified effluent and, more particularly, about 100 mg/l of purified effluent (i.e. 100 mg/l±10 mg/l).

Likewise, the concentration in COD in this effluent is less than 400 mg/l of purified effluent, in particular less than 370 mg/l of purified effluent, notably less than 340 mg/l of purified effluent and, more particularly, about 300 mg/l of purified effluent (i.e. 300 mg/l±30 mg/l).

Indeed, the inventors have shown that by using, on the one hand, the main steps of the method for treatment such as described in patent application FR 2 931 814 and, on the other hand, a membrane filtration both on the perchlorate treatment reactor and on the reactor for reducing COD by pooling (i.e. mutualizing) the membrane filtration of the perchlorate treatment reactor with the reactor for reducing COD, it is possible to obtain a discharge effluent that is compliant with the legislative requirements and standards and therefore entirely environmentally-friendly.

Using a membrane filtration pooled i.e. shared on two reactors of the treatment method according to the invention makes it possible to retain the SM leaving the reactor for reducing COD. This usage therefore makes it possible to avoid using the reactor for reducing SM of the methods of the prior art such as lamellar clarifiers and therefore to avoid the problems linked to the usage thereof. As already mentioned, such reactors for reducing SM must be maintained on a regular basis in order to prevent the soiling thereof and do not make it possible to ensure a retaining of the microorganisms present in particular when the latter clarify little even in the presence of flocculant.

In addition, implementing a membrane filtration at the outlet of the reactor for reducing COD makes it possible to retain the microorganisms that ensure this reduction. At the end of this second membrane filtration, the retentate rich in microorganisms can be recycled, all or in part, in the original reactor for reducing COD. This prevents the loss in microbiology observed in the methods of the prior art since the microorganisms remain sufficiently present, in the reactor for reducing COD, to degrade the residual COD.

A noter however that is was not obvious to select, to resolve the problems of the methods of treatment of the prior art, a membrane filtration since this technology, as with all forced filtration technologies, has the disadvantage of being energy intensive and therefore little favoured in the treatment of water.

Thus, the present invention relates to a method for treating an aqueous solution containing ammonium perchlorate and optionally nitrate ions, said method having a nitrification/denitrification sequence then a step of reducing perchlorates, the liquid effluent obtained at the end of this step of reducing perchlorates being subjected to a first membrane filtration, the permeate obtained following this first membrane filtration being put into contact, in a reactor in aerobic conditions, with microorganisms able to carry out the oxidation of organic materials, then the liquid effluent leaving this reactor being subjected to a second membrane filtration, the first membrane filtration and the second membrane filtration being carried out on the same membrane filtration unit.

The method according to the present invention aims to treat the aqueous solutions resulting from the grinding under water of the waste comprising solid composite propellant base the oxidiser of which comprises or is constituted of ammonium perchlorate. Such solutions are usually called "brine". However, more generally, the method according to the present invention applies to the treatment of any residual aqueous solution containing ammonium perchlorate and optionally nitrate ions.

Indeed, the method according to the present invention makes it possible to treat aqueous solutions that contain large quantities of ammonium perchlorate, including saturated solutions with an excess of undissolved ammonium perchlorate, optionally in the presence of nitrates. The aqueous solutions concerned can in particular contain up to 100 g/l of ammonium perchlorate with optionally up to 100 g/l of nitrates.

In reference to FIG. 1 and to the "storage" block of the latter, the aqueous solution to be treated can be, prior to the implementation of the method according to the invention, subjected to a storage. The latter typically carried out in a storage basin has for vocation to ensure, on the one hand, a continuous supplying of the series of reactors implemented in the treatment method and, on the other hand, a buffer role as to the composition of the aqueous solutions to be treated.

The "Ammonium and Nitrate Treatment" block of FIG. 1 corresponds to the nitrification/denitrification sequence that the treatment method according to the invention has. As mentioned hereinabove, this sequence is comparable to the nitrification/denitrification sequence described in patent application FR 2 931 814.

Consequently, this sequence comprises at least one step of nitrification in aerobic conditions, with nitrifying bacteria in the presence of a mineral carbonaceous substrate, advantageously carbon dioxide, and of nutritional elements followed by at least one step of denitrification, in anaerobic or anoxic conditions, with denitrifying bacteria in the presence of an organic carbonaceous substrate, advantageously methanol or acetic acid, and of nutritional elements. By way of examples of nutritional elements used during the nitrification and/or during the denitrification, mention can be made of iron, calcium, potassium, magnesium and phosphate. It is possible that the nitrification/denitrification sequence of the method according to the invention has several steps of nitrification implemented in different reactors and/or several steps of denitrification implemented in different reactors.

The nitrifying bacteria used during the step of nitrification are able to ensure the nitrification of the ammonium ions into nitrite and nitrate ions. These bacteria belong for example to the genera *Nitrosococcus, Nitrosospira, Nitrosomonas* and *Nitrobacter*. The denitrifying bacteria used during the step of denitrification are able to ensure the denitrification of the nitrate and nitrite ions into molecular nitrogen. These bacteria belong for example to the genera *Pseudomonas, Micrococcus, Denitrobacillus, Spirillum* and *Achromobacter*. The nitrifying and denitrifying bacteria mentioned hereinabove are usually present in the activated sludge of urban waste water treatment plants and sedimentary sludge.

Typically, the step of nitrification is carried out in a reactor in aerobic conditions i.e. a reactor in which the minimum concentration in dissolved molecular oxygen is greater than 2 mg/l. This reactor can be seeded (i) by nitrifying bacteria in particular such as defined hereinabove, obtained from culture strains, (ii) by nitrifying bacteria present in an activated sludge known by those skilled in the art as containing such bacteria or (iii) by one of the mixtures thereof.

The step of denitrification is carried out in a reactor in anaerobic conditions (absence of air) or anoxic conditions (lack of oxygen) i.e. a reactor in which the maximum concentration in dissolved molecular oxygen is less than 1 mg/l. This reactor can be seeded (i) by denitrifying bacteria in particular such as defined hereinabove, obtained from culture strains, (ii) by denitrifying bacteria present in an activated sludge known by those skilled in the art as containing such bacteria or (iii) by one of the mixtures thereof. The reactor in which the step of nitrification is carried out and the one in which the step of denitrification is carried out are mounted in series.

The nitrification/denitrification sequence can also be implemented in a single reactor with alternating nitrification/denitrification functions, in aerobic then anaerobic conditions, for, respectively, the nitrification then the denitrification. In this alternative, the reactor is seeded by a mixture of nitrifying bacteria and denitrifying bacteria such as defined hereinabove coming from culture strains and/or activated sludge.

If necessary, those skilled in the art can find additional information as to the nitrification/denitrification sequence in patent application FR 2 931 814.

Typically the nitrification/denitrification sequence is a cyclical process, while the step of reducing perchlorates has to be continuous. Thus, it can be necessary to store the liquid effluent obtained at the end of the nitrification/denitrification sequence before being able to subject it, continuously, to the step of reducing perchlorates. To do this, a buffer tank is present between the nitrification/denitrification reactor or reactors and the reactor with a perchlorate-reducing function. This tank corresponds to the ""Demod" buffer basin" block in FIG. 1 with "demod" for demodulation.

The "Perchlorate treatment" block in FIG. 1 corresponds to the step of reducing perchlorates that the treatment method according to the invention has. As mentioned hereinabove, this step is comparable to the step of reducing perchlorates described in patent application FR 2 931 814.

Thus, the step of reducing perchlorates is implemented in anaerobic or anoxic conditions, generally within a single reactor. The latter is seeded with bacteria that can in particular be bacteria from the prior art, known as perchlorate ion-reducing bacteria, such as described in patent application FR 2 931 814. Advantageously, these bacteria belong to the species *Exiguobacterium mexicanum, Bacillus cereus, Staphylococcus warneri* and/or *Staphylococcus pasteuri*. In particular, the bacteria species *Exiguobacterium mexicanum* and/or *Bacillus cereus* are used for the step of reducing perchlorates and, more particularly, the bacteria species *Exiguobacterium mexicanum*. The reactor can be seeded (i) by such bacteria, obtained from culture strains, (ii) by such bacteria present in an activated sludge known by those skilled in the art or (iii) by one of the mixtures thereof. According to the nature and the origin of the activated sludge implemented, a phase of specialisation or of acclimatisation in the reduction of perchlorate ions of bacteria enclosed in the activated sludge used in the reactor with a perchlorate ion-reducing function can be necessary, as described in patent application FR 2 931 814. The step of reducing perchlorates is generally implemented in the presence of an organic carbonaceous substrate such as methanol or acetic acid and of nutritional elements such as iron, calcium, potassium, magnesium and phosphate.

If necessary, those skilled in the art can find additional information as to the step of reducing perchlorates in patent application FR 2 931 814.

The liquid effluent obtained at the end of the step of reducing perchlorates in the treatment method according to the invention is subjected to a first membrane filtration. In other terms, the liquid effluent leaving the reactor with a perchlorate ion-reducing function is conveyed and in particular pumped to a membrane filtration unit. This step corresponds in FIG. 1 to the "filtration" block.

Indeed, in the framework of the method according to the invention, the membrane filtration unit is a device outside the various bioreactors. The method according to the invention therefore implements bioreactors with an outer loop membrane that are distinguished from bioreactors with immersed membranes that contain, in their volume, these membranes. Using bioreactors with an external loop membrane is a condition sine qua non for obtaining a pooling of the filtration unit between two different bioreactors.

Typically, the membrane filtration unit implemented at the end of the step of reducing perchlorates comprises at least one filtration membrane and a permeate tank. This filtration membrane is typically porous and can be a microfiltration membrane or an ultrafiltration membrane. A microfiltration membrane usually has a pore size comprised between 0.1 and 3 µm and in particular a pore size comprised between 0.1 and 1 µm. An ultrafiltration membrane usually has a pore size comprised between 0.001 and 0.1 µm. A microfiltration membrane generally retains particles of a significant size and fat, while an ultrafiltration membrane retains, in addition, compounds in colloidal form such as proteins. The microfiltration or ultrafiltration membranes that can be used in the framework of the present invention can be made of ceramic or polymer such as a synthetic polymer. For example, they can be made from a material selected from the group consisting of silicon carbide, graphene, polyacrylonitrile, polyethylene, polyethylsulfone, polysulfone, polytetrafluoroethylene and polyvinylidenefluoride.

In a first embodiment, the membrane filtration unit implemented at the end of the step of reducing perchlorates comprises a microfiltration membrane. This microfiltration membrane can be a flat sheet membrane or a hollow fibre membrane. Advantageously, the microfiltration membrane implemented in the framework of the present invention is a hollow fibre membrane.

In a second embodiment, the membrane filtration unit implemented at the end of the step of reducing perchlorates comprises an ultrafiltration membrane. This ultrafiltration membrane can be a flat sheet membrane or a hollow fibre membrane. Advantageously, the ultrafiltration membrane implemented in the framework of the present invention is a hollow fibre membrane.

The membrane filtration implemented at the end of the step of reducing perchlorates can be an internal/external filtration of the tangential type. Advantageously, the membrane filtration implemented at the end of the step of reducing perchlorates is conducted by imposing a pressure gradient. In particular, the filtration treatments with microfiltration membrane or ultrafiltration membrane involve a difference in pressure between the two faces of the membrane, less than 0.5 MPa and in particular comprised between 0.02 MPa and 0.2 MPa.

At the end of this first step of membrane filtration, a retentate (or concentrate) and a permeate (or filtrate) are obtained. The permeate corresponds to the liquid effluent obtained which is conveyed to the reactor wherein the reduction in COD is carried out. Retentate in particular comprises bacteria initially present in the reactor with a perchlorate-reducing function. It is therefore possible to use known backwashing techniques to clean the membrane or membranes and recycle the bacteria thus recovered to the reactor with a perchlorate-reducing function.

In a practical manner, the filtration unit implemented with at least one filtration membrane such as defined hereinabove comprises an inlet for the effluent to be filtered in which a conduit passes to transport the effluent to be filtered from the recipient with a perchlorate-reducing function. It also comprises, at the permeate tank, an effluent outlet through which a conduit passes to transport the permeate to the reactor with the COD-reducing function. It finally comprises an outlet for the retentate connected to a conduit for recirculation to the recipient with a perchlorate-reducing function. The permeate tank also has an effluent outlet in which a conduit passes to empty the end of the tank and transport it to the plant head in the storage basin and/or in the reactor with a nitrification and/or denitrification function and this, in order to prevent a contamination, in the permeate tank, of the permeate obtained at the end of the second step of membrane filtration by a residual permeate obtained at the end of the first step of membrane filtration.

The "COD Reduction" block in FIG. 1 corresponds to the step during which the organic matter contained in the permeate coming from the first membrane filtration is degraded, biologically, by purifying microorganisms i.e. microorganisms able to carry out the oxidation of organic materials, such as bacteria. This step is a conventional step in the treatment of wastewater during which the bacterial biomass consumes, through biochemical reactions, the biodegradable organic carbon, contained in the water to be treated.

Thus, the step of reducing the COD is implemented in aerobic conditions, generally within a single reactor, in particular a single open reactor. It is however possible to provide oxygen in this reactor in order to favour the biochemical reactions of oxidation. To do this, the reactor with a COD-reducing function has means for injecting air. It can also have means for stirring so that the putting into contact between the effluent to be treated and the microorganisms able to carry out the oxidation of the organic matter is done under stirring and this, to facilitate the mixing between the effluent to be treated i.e. the permeate coming from the first membrane filtration and the purifying microorganisms and a good aeration of the mixture.

Typically, the reactor with a COD-reducing function is seeded with microorganisms such as bacteria of the prior art, known as bacteria able to carry out the oxidation of organic matter. Advantageously, these bacteria belong to the genera *Bacillus, Achromobacter, Flavobacterium* and *Pseudomonas*. The reactor can be seeded (i) by such bacteria, obtained from culture strains, (ii) by such bacteria present in an activated sludge known by those skilled in the art to carry out the oxidation of the organic matter or (iii) by one of the mixtures thereof.

It is also possible to add nutritional elements necessary for the development of microorganisms of the bacteria type present in the reactor with a COD-reducing function. These nutritional elements are in particular selected from trace elements such as iron, calcium, potassium, magnesium and phosphate. These elements can be added to the aerobic reactor or in the permeate coming from the first step of membrane filtration before it enters the reactor. Alternatively, this adding of elements and in particular of trace elements may not be necessary.

The duration of the step of reducing the COD is determined by the time required to obtain a content in COD that is compatible with the discharge standards in effect. It is according to the inlet flow rate of the effluent to be treated, its concentration in organic matter and the volume of the aerobic reactor used. Typically this duration is comprised between 30 min and 3 h.

The liquid effluent obtained at the end of the step of reducing the COD in the treatment method according to the invention is subjected to a membrane filtration that corresponds to the second step of membrane filtration in the framework of this method. In other terms, the liquid effluent leaving the reactor with a COD-reducing function is conveyed and in particular pumped to the filtration unit also used for the first step of membrane filtration.

As described hereinabove, the permeate obtained at the end of this second step of membrane filtration is, due to its satisfying composition in terms of discharge standards, an effluent able to be discharged into the natural environment. Consequently, the permeate obtained at the end of the second step of membrane filtration is discharged into the natural environment.

For the purpose of the second step of membrane filtration, the filtration unit comprises an inlet for the effluent to be filtered wherein a conduit passes to transport the effluent to be filtered coming from the recipient with a COD-reducing function. It also comprises an effluent outlet wherein a conduit passes to allow for the discharge of the permeate to the natural environment. It finally comprises an outlet for the retentate connected to a conduit for recirculation to the recipient with a COD-reducing function.

In the method according to the invention, the first step of membrane filtration and the second step of membrane filtration are carried out using the same membrane filtration unit as shown in the drawing.

Thus, the various conduits present at the filtration unit and allowing for the supplying with effluent coming from the recipient with a perchlorate-reducing function, the supplying with permeate of the recipient with a COD-reducing function, the supplying with effluent coming from the recipient with a COD-reducing function and the discharging of the permeate into the natural environment are provided with valves of which the opening and the closing are controlled to allow for a sequential use of this unit for the first and the second membrane filtrations.

Example of Treatment According to the Invention of an Aqueous Solution Containing Both Ammonium Perchlorate and Nitrate Ions According to the Method of the Present Invention The installation implemented for this treatment comprises:
- a storage basin (BT) wherein is disposed and optionally stored an aqueous solution containing both ammonium perchlorate and nitrate ions before implementation of the method according to the invention;
- a 150 m³ basin for treating ammonium/nitrates wherein the nitrification and the denitrification are carried out by alternating aerobic (nitrification) and anoxic (denitrification) phases;
- a 5 m³ demodulation tank wherein is disposed the liquid effluent obtained at the end of the nitrification/denitrification sequence carried out in the ammonium/nitrate treatment basin;
- a 150 m³ basin for treating perchlorates wherein the step of reducing perchlorate ions is carried out;
- a 12 m³ basin for reducing COD wherein the step of oxidation of organic matter is carried out; and
- a filtration unit comprising an ultrafiltration membrane of the ORELIS brand comprised of a casing of 99 membranes and 33 channels of a surface flow rate equal to 25 l/h/m² and a 1 m³ tank for permeate.

The storage basin BT, the ammonium/nitrate treatment basin, the demodulation tank, the perchlorate treatment basin, the filtration unit and the COD-reducing basin are mounted in series. Said basins and tanks include means for stirring, means for controlling the pH, means for injecting air (activated or not), means for supplying with, and the outlet of, the effluent, as well as means for introducing additional compounds.

The ammonium/nitrate treatment basin contains both an nitrifying acclimated activated sludge and a denitrifying acclimated sludge. When this basin is operating in aerobic conditions (nitrification), the air injection system that it has is operational allowing for a supplying, with air at a flow rate of 6-7 kg $O_2$/h. When the ammonium/nitrate treatment basin is operating in anoxic conditions (denitrification), the aeration is stopped and only the stirring is retained for the allotted time with an additional monitoring of the redox signal of the tank. The ammonium/nitrate treatment basin is also supplied with trace elements (between 50 and 90 l/day according to the concentration in perchlorate of the effluent at the inlet), with methanol (up to 50 l/d, value adjusted according to the daily measurements in the basin) and with soda for the adjustment of the pH.

The perchlorate treatment basin contains a perchlorate ion-reducing sludge, i.e. a sludge that has been specialised and acclimated. It is supplied with methanol (30 to 50 l/d).

The COD-reducing basin contains a sludge oxidising the organic matter, i.e. a sludge that has been specialised and acclimated.

In accordance with the method according to the invention, in the ammonium/nitrate treatment basin, an aqueous solution is introduced containing 10 g/l of ammonium perchlorate and 4 g/l of nitrates initially contained in the storage basin BT. The aqueous solution is mixed with the activated sludge, via stirring. The temperature is maintained greater than 15° C. The liquid effluent leaving the ammonium/nitrate treatment basin no longer contains ammonium (<1%) and practically no nitrates and nitrites (<1%). It is injected into the demodulation tank by overflow at the supply flow rate then from the demodulation tank to the perchlorate treatment basin by overflow at the supply flow rate.

In the perchlorate treatment basin, the liquid effluent leaving the demodulation tank is mixed with the specialised and acclimated activated sludge for the reduction of the perchlorate ions, via stirring. The temperature is maintained greater than 15° C.

The effluent leaving the perchlorate treatment basin is then filtered using the membrane filtration unit with ultrafiltration membrane. The retentate recovered is recycled in said perchlorate treatment basin. The permeate resulting from this ultrafiltration is an effluent purified from ammoniums, nitrates, nitrites and perchlorates, it is recovered in a permeate tank.

This permeate is injected into the COD-reducing basin via the permeate tank via overflow at the supply flow rate. It is then mixed with the specialised and acclimated activated sludge for the oxidation of the organic matter, via stirring.

The effluent leaving the COD-reducing basin is then filtered using the membrane filtration unit with ultrafiltration membrane already implemented for the effluent leaving the perchlorate treatment basin. The retentate recovered is recycled in said COD-reducing basin.

By following this method, the concentrations in ammonium, nitrate/nitrite, perchlorate in the permeate obtained at the end of the second step of membrane filtration and collected in the permeate tank are less than 1% by weight. This permeate is also compliant in terms of reducing COD and reducing SM and can therefore be discharged into the natural environment.

Table 1 hereinafter presents a first treatment cycle according to the present invention with a plant flowrate set to 8 m³/d.

TABLE 1

| | 0-2 h | 2-7 h | 7-10 h | 10-11 h | 11-13 h | 13-18 h | 18-21 h | 21-22 h | 22-24 h |
|---|---|---|---|---|---|---|---|---|---|
| Supplying of Ammonium and Nitrate Treatment Basin | X | | | | X | | | | |
| Nitrification | X | X | | | X | X | | | |
| Denitrification | | X | X | | | X | X | | |
| Decantation | | | | X | | | | X | |
| Supplying of demodulation tank + Sludge purge | | | | | X | | | | X |
| Supplying of Perchlorate Treatment | X | X | X | X | X | X | X | X | X |
| Membrane filtration on perchlorate Treatment and Supplying of COD Reduction | X | X | | | X | X | | | |
| Membrane filtration on COD Reduction + Discharge | | | X | X | X | | | X | X |

For the filtration cycle of Table 1, the plant flow rate i.e. the flow rate at which the permeate obtained following the second step of filtration is discharged into the natural environment is equal to 8 m³/day. To do this, the average supply flow rate between BT and the ammonium/nitrate treatment basin is 2.80 m³/h, the average supply flow rate between the ammonium/nitrate treatment basin and the demodulation tank of 16.50 m³/h, the average supply flow rate between the demodulation tank and the perchlorate treatment basin of 0.34 m³/h, the average supply flow rate between the permeate tank following the first step of filtration and the COD-reducing basin of 0.58 m³/h and the average flow rate at which the permeate obtained following the second step of filtration is discharged into the natural environment is equal to 1.30 m³/h.

Thus, for a plant flow rate equal to 8 m³/day, in order to allow for the operation of the ultrafiltration (UF) on the perchlorate treatment basin in treatment then on the COD-reducing basin for the discharge, it has been calculated that $((6\times60 \text{ min}+2\times10 \text{ min})/\text{day})$ has to be discharged at 1.30 m³/h to allow for the washings of the required UF.

The identical approach was made for a target plant flow rate of 5 m³/day. Thus, Table 2 hereinafter presents a second treatment cycle according to the present invention with a plant flow rate set to 5 m³/d.

TABLE 2

| | 0-2 h | 2-5 h | 5-7 h | 7-10 h | 10-11 h | 11-13 h | 13-16 h | 16-18 h | 18-21 h | 21-22 h | 22-24 h |
|---|---|---|---|---|---|---|---|---|---|---|---|
| Supplying of Ammonium and Nitrate Treatment Basin | X | | | | | X | | | | | |
| Nitrification | X | X | X | | | X | X | X | | | |
| Denitrification | | X | X | X | | | X | X | X | | |
| Decantation | | | | | X | | | | | X | |
| Supplying of demodulation tank + Sludge purge | | | | | | X | | | | | X |
| Supplying of Perchlorate Treatment | X | X | X | X | X | X | X | X | X | X | X |
| Membrane filtration on perchlorate Treatment and Supplying of COD Reduction | X | X | X | | | X | X | X | | | |
| Membrane filtration on COD Reduction + Discharge | | | | X | X | | | | X | X | X |

In this alternative cycle presented in Table 2, the average supply flow rate between BT and the ammonium/nitrate treatment basin is 1.30 m$^3$/h, the average supply flow rate between the ammonium/nitrate treatment basin and the demodulation tank of 10.50 m$^3$/h, the average supply flow rate between the demodulation tank and the perchlorate treatment basin of 0.21 m$^3$/h, the average supply flow rate between the permeate tank following the first step of filtration and the COD-reducing basin of 0.58 m$^3$/h and the average flow rate at which the permeate obtained following the second step of filtration is discharged into the natural environment is equal to 1.30 m$^3$/h.

With a supply flow rate between the permeate tank following the first step of filtration and the COD-reducing basin and an average flow rate at which the permeate obtained following the second step of filtration is discharged into the natural environment identical to those of the cycle described in Table 1, the discharge times are shorter—4×60 min/day (Table 2).

Calculation of the Membrane Filtration Surface

For the needs of the treatment of perchlorates, the sizing of the ultrafiltration is based on a surface flow rate equal to 25 l/h/m$^2$ (anaerobic filtration).

For the needs in the reduction in COD, the sizing of the ultrafiltration is based on a surface flow rate equal to 60 l/h/m$^2$ (aerobic filtration) with the constraint of the average discharge flow rate identified hereinabove.

It was therefore chosen to take the sizing required for the aerobics and to pool the means even by being beyond the needs for the treatment of the perchlorates.

Detailed Protocol in Order to Prevent a Mixture Between the Two Filtrations in the Permeate Tank of the Ultrafiltration A first filtration is carried out on the perchlorate ion treatment basin. The tank to the COD-reducing basin is progressively filled via the permeate tank with effluents free of perchlorate but still containing COD, at a low flow rate i.e. 0.58 m$^3$/h. The COD is treated in the COD-reducing basin as the latter is filled.

The filling of the COD-reducing basin is completed by emptying the permeate tank; in order to prevent the mixing of the fines of permeate tank between the perchlorate treatment/COD reducing cycles, the latter is fully emptied by turning over the end of the tank at plant head in the storage basin BT and/or in the ammonium/nitrate treatment basin.

When the COD-reducing basin is full, the filtration on this basin is turned on, the permeate tank is filled again, in this step, with the effluents that are free of perchlorates, COD & SM, in accordance with the discharge.

When the permeate tank is full following this second filtration, it can be emptied to discharge.

The invention claimed is:

1. A method for treating an aqueous solution containing ammonium perchlorate and optionally nitrate ions, said method having a nitrification/denitrification sequence then a step of reducing perchlorates, a liquid effluent obtained at the end of the step of reducing perchlorates being subjected to a first membrane filtration,
   wherein a permeate obtained from the first membrane filtration is put into contact, in a reactor in aerobic conditions, with microorganisms able to carry out the oxidation of organic materials,
   then in that a liquid effluent leaving the reactor is subjected to a second membrane filtration,
   the first membrane filtration and the second membrane filtration being carried out on a same membrane filtration unit.

2. The method according to claim 1, wherein said filtration unit comprises at least one filtration membrane and a permeate tank.

3. The method according to claim 2, wherein said at least one filtration membrane is a microfiltration membrane.

4. The method according to claim 2, wherein said at least one filtration membrane is an ultrafiltration membrane.

5. The method according to claim 1, wherein said nitrification/denitrification sequence comprises at least one step of nitrification in aerobic conditions, with nitrifying bacteria in the presence of a mineral carbonaceous substrate and of nutritional elements followed by at least one step of denitrification, in anaerobic or anoxic conditions, with denitrifying bacteria in the presence of an organic carbonaceous substrate and of nutritional elements.

6. The method according to claim 1, wherein step of reducing perchlorates implements bacteria selected from the group consisting of bacteria belonging to the species *Exiguobacterium mexicanum*, bacteria belonging to the species *Bacillus cereus*, bacteria belonging to the species *Staphylococcus warneri*, bacteria belonging to the species *Staphylococcus pasteuri* and mixtures thereof.

7. The method according to claim 1, wherein the permeate obtained at the end of the second step of membrane filtration is discharged into a natural environment.

* * * * *